(No Model.)
W. T. ARNOLD.
Cotton Planter.
No. 233,457. Patented Oct. 19, 1880.
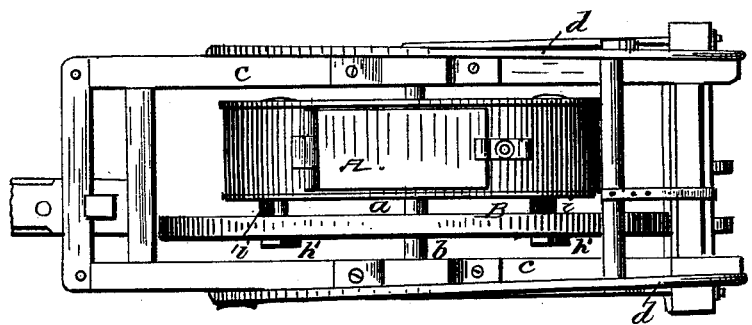
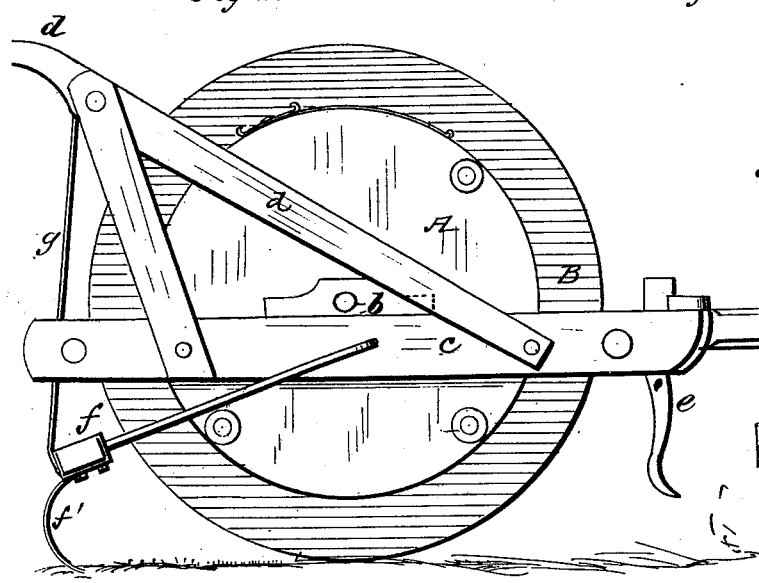
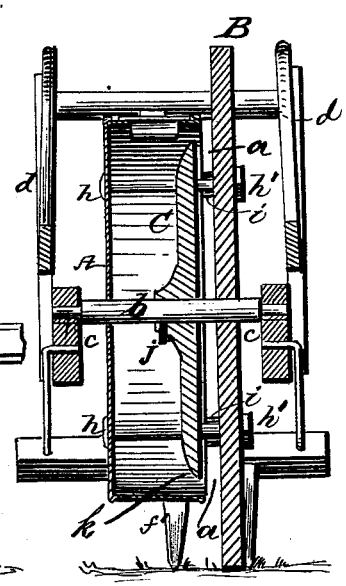
Witnesses
Fred G. Dieterich
A. H. Krause
Inventor
William Thomas Arnold
by Louis Bagger
attorneys

UNITED STATES PATENT OFFICE.

WILLIAM T. ARNOLD, OF MILNER, GEORGIA.

COTTON-PLANTER.

SPECIFICATION forming part of Letters Patent No. 233,457, dated October 19, 1880.

Application filed August 10, 1880. (No model.)

To all whom it may concern:

Be it known that I, WILLIAM THOMAS ARNOLD, of Milner, in the county of Pike and State of Georgia, have invented certain new and useful Improvements in Cotton-Planters; and I do hereby declare that the following is a full, clear, and exact description of the invention, which will enable others skilled in the art to which it appertains to make and use the same, reference being had to the accompanying drawings, which form a part of this specification, and in which—

Figure 1 is a plan view of my improved cotton-planter. Fig. 2 is a side view of the same, and Fig. 3 is a vertical transverse section thereof.

Similar letters of reference indicate corresponding parts in all the figures.

This invention appertains to improvements in cotton-planters or seeding-machines with rolling hoppers; and it consists in the improvement hereinafter set forth, and particularly pointed out in the claim.

In the accompanying drawings, A marks the hopper, which is preferably circular, with its periphery either cylindrical or flaring toward the wheel-disk, and a space, $a$, sufficiently large to permit of the passage of the seed, provided between its inner edge or face and the disk or wheel. The hopper is secured at its center upon the axle or shaft $b$ of the wheel.

B is the wheel or disk, considerably greater in diameter than the hopper, with which it is relatively associated, and having its shaft suitably hung upon a frame, $c$, having the handles $d$, and carrying at its forward end the colter or opener $e$, and having suspended from its rear end the coverer $f$, with teeth $f'$, and a vertically adjusting or raising and lowering strap or chain, $g$. This strap or chain is connected to a cross connecting-piece between the handles.

The hopper has bolts $h$, extending through and nutted, as at $h'$, on the outside of the wheel or disk B, with blocks of elastic material or rubber $i$ inserted and held in the space between the hopper and wheel by the adjusting-bolts $h$ and their nuts $h'$. These bolts and the nuts permit of increasing or reducing the size of the opening or space $a$, in order to permit of regulating the planting capacity of the planter. The rubber or elastic blocks serve as springs, when under the pressure of the bolts, to force the wheel away from the hopper as the nuts on the bolts are loosened.

C is an inner disk, secured adjustably upon the axle of the wheel by set-screw $j$, to permit it to be set nearer to or farther from the wheel, as may be desired. Its periphery is preferably beveled to allow the easy or ready passage of the seed. Between its periphery and the inner surface of the periphery of the hopper is provided a space or opening, $k$, through which the seed first passes from the hopper to finally be discharged through the opening $a$ into the ground, thus effecting their thorough and uniform distribution.

Having thus described my invention, I do not claim, broadly, the combination, with the carrier wheel or disk, of the cylindrical or circular hopper keyed upon the same axle, with an open space between the rim of the hopper and the contiguous face of the wheel, through which the seed is fed; but

I claim as my improvement and desire to secure by Letters Patent of the United States—

In a cotton-planter, the combination of the carrying wheel or disk B, hopper A, provided with the concentric adjustable disk C, and nutted bolts $h$, having elastic washers $i$, for adjusting the feed-space between the disk and hopper, as set forth.

In testimony that I claim the foregoing as my own I have hereto affixed my signature in presence of two witnesses.

WILLIAM THOMAS ARNOLD.

Witnesses:
JOSEPHUS GILMORE MARTIN,
REUBEN FRANKLIN JACKSON.